(No Model.) 3 Sheets—Sheet 2.
W. BIDDLE.
ELECTRIC CAR LIGHTING APPARATUS.
No. 550,860. Patented Dec. 3, 1895.
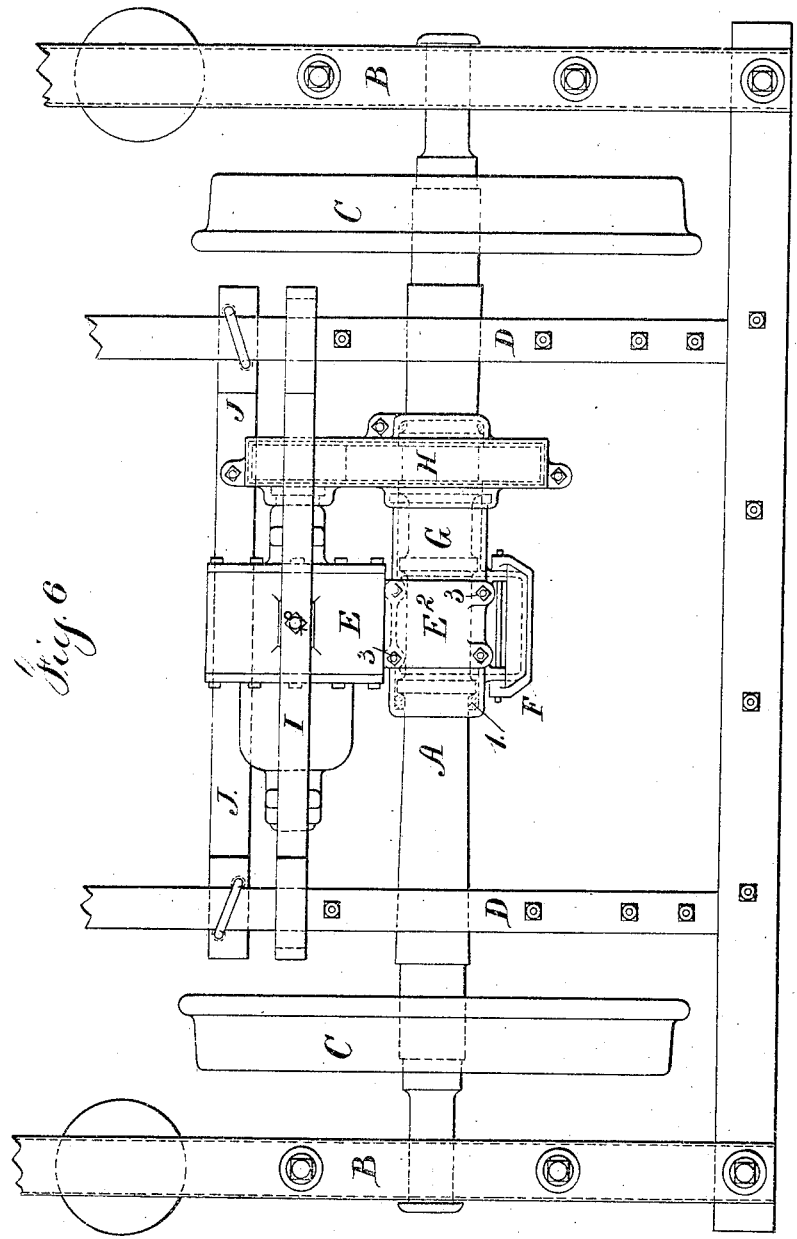

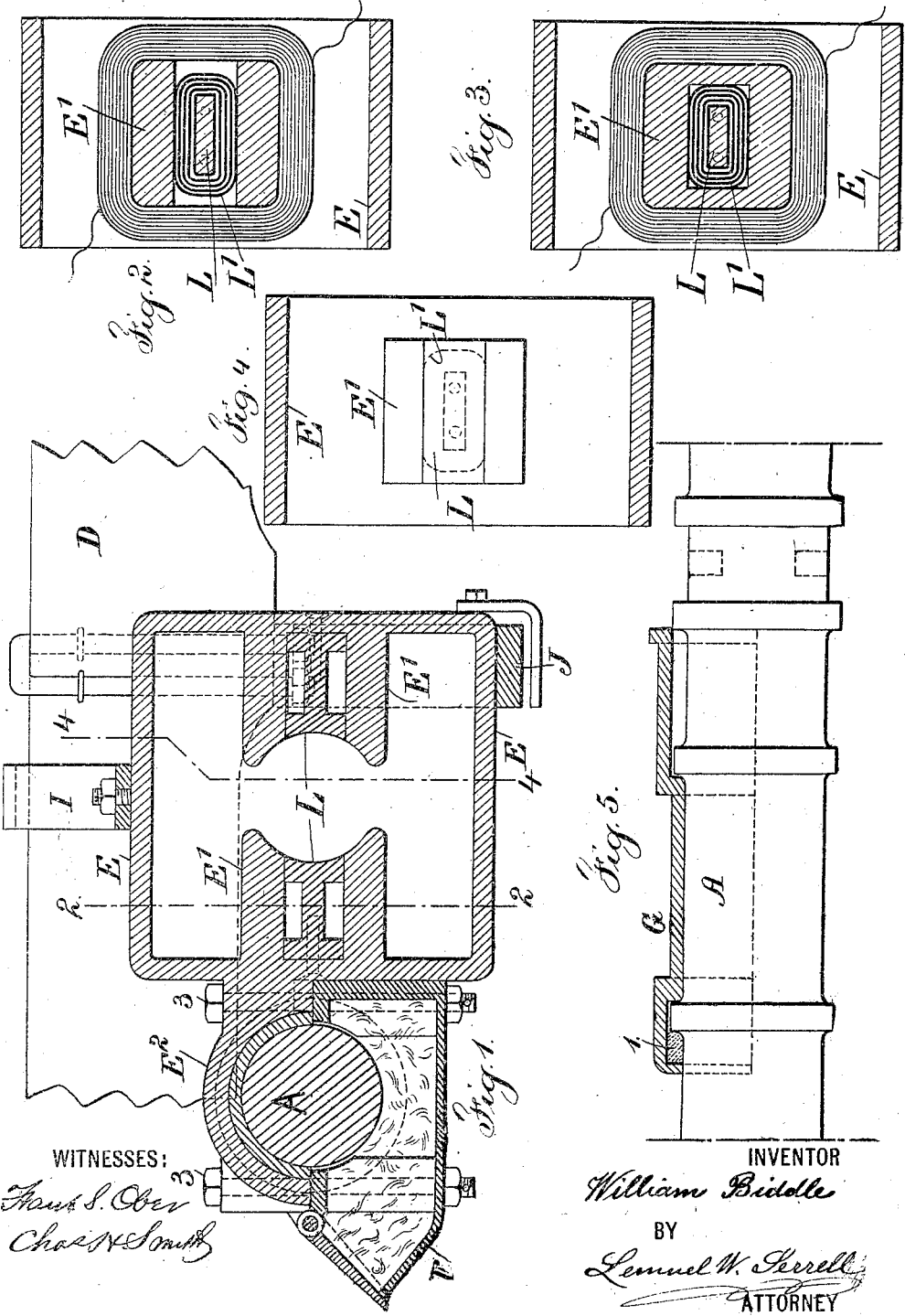

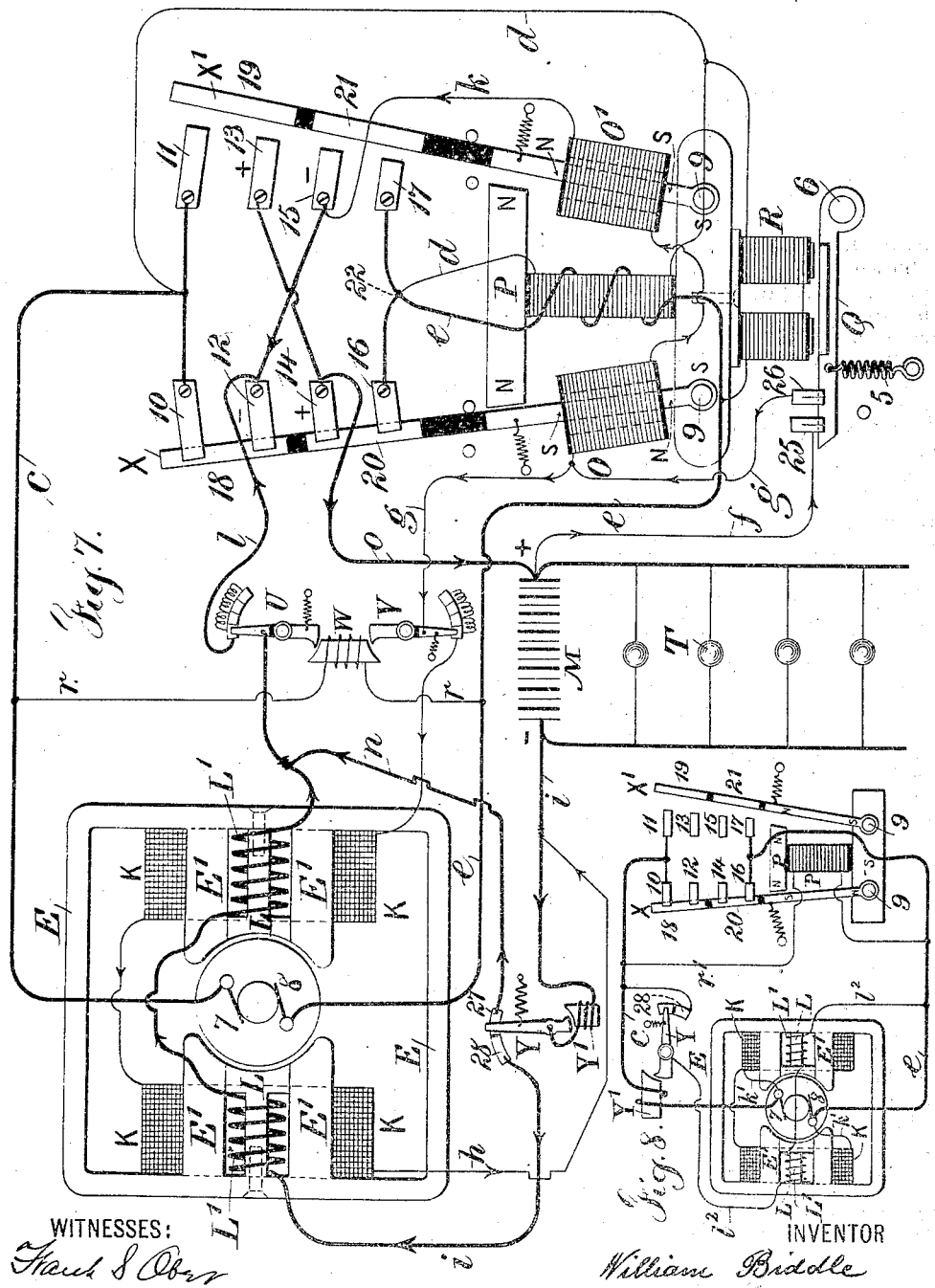

UNITED STATES PATENT OFFICE.

WILLIAM BIDDLE, OF BROOKLYN, NEW YORK.

ELECTRIC CAR-LIGHTING APPARATUS.

SPECIFICATION forming part of Letters Patent No. 550,860, dated December 3, 1895.

Application filed January 7, 1895. Serial No. 534,022. (No model.)

*To all whom it may concern:*

Be it known that I, WILLIAM BIDDLE, a citizen of the United States, residing at Brooklyn, in the county of Kings and State of New York, have invented an Improvement in Electric Car-Lighting Apparatus, of which the following is a specification.

Difficulty has heretofore been experienced in regulating the current from a dynamo driven by a connection to the axle of a railway-car in consequence of the great variations arising from the connection of the armature to the axle of the car-wheel, and when the speed of the car is reduced the electromotive force from the armature is frequently considerably below that from the storage or secondary battery, and when the car is traveling at its maximum speed the voltage is so much in excess of the storage-battery and of that required in the lamp-circuit that the lamps are liable to become injured. To render uniform, or nearly so, the current arising from the rotation of the dynamo-armature, I provide compound poles for the field-magnets—that is to say, the poles of the field-helices are made with openings for receiving neutralizing-magnets, the helices of which are wound in such a manner that the magnetism developed tends to cut down or neutralize the magnetism developed by the field-helices, so that the difference in the magnetism of the neutralizing and field magnets will remain nearly uniform and thereby continue to present nearly uniform lines of magnetism to be cut by the rotating armature, and thereby the output of current will be nearly uniform regardless of the speed of the armature, and I provide an automatic switch for closing the circuit to the helices of the neutralizing-magnets when the current in the main circuit reaches the average or desired voltage, so as to bring the neutralizing-magnets into action to prevent the development of an undue electromotive force by the increased speed of the armature.

In the drawings, Figure 1 is a section through the axle and the frame and poles of the dynamo. Fig. 2 is a cross-section at the line 2 of Fig. 1. Fig. 3 is a cross-section similar to Fig. 2, but with the helix of the neutralizing-magnet in a cavity instead of a slot. Fig. 4 is a cross-section at the line 4 of Fig. 1. Fig. 5 is an elevation of a portion of the axle and a section of the sleeve. Fig. 6 is a plan view illustrating the manner of mounting the dynamo upon the axle and truck. Fig. 7 is a diagram of the circuits, and Fig. 8 is a partial diagram illustrating the helices of the neutralizing-magnets in one shunt and the helices of the field-magnets in another shunt of the main line between the brushes.

The axle A is represented as provided with wheels C, and a portion of the truck-frame is shown at B and the safety-beams at D.

The dynamo-frame E is provided with an arm $E^2$, extending out at one side and forming a bearing over the sleeve or journal-box that rests upon the axle, and the oil-box F is provided below the axle. There are bolts 3 for connecting the parts together.

The case H for the gears that connect the axle A to the shaft of the armature is preferably divided and the two halves bolted together, as illustrated in Fig. 6, and the end of the sleeve G is received into a recess at one side of the case H, and the dust is excluded from the parts by suitable packing introduced at 1; but this packing does not form any part of my present invention.

The top bearing-bar I is bolted onto the frame E of the dynamo and rests at its ends upon the safety-beams D, and the lower bearing-bar J is provided with clips for securing the same to such safety-beams D, and such bearing-bar J passes across below the dynamo, so that the said dynamo is securely fastened to the truck-frame; but the frame of the dynamo may slide upon the lower bearing J, or the upper bearing I may slide upon the safety-beams D, should there be any looseness in the truck-frame.

If a car fitted with a dynamo runs off the track, the pedestals of the axle-boxes are liable to be broken and the axle to be displaced in its relation to the truck-frame, and if this occurs the dynamo-frame is liable to slip off the bar J and swing down upon the cross-ties of the track or the bar J to be broken. By the present improvement the bar I, being bolted firmly to the top of the dynamo-frame and having ends that hook over the safety-beams, forms an emergency support for holding up the dynamo in case of accident, and the ends of the bar I can slide freely upon the safety-beams, as the axle may become displaced in its relation to the truck-frame, and in consequence of the cross-bar I being nearly central over the dynamo the entire dynamo is suspended and not liable to drop in either direction upon the cross-ties of the track.

The frame E of the dynamo is advantageously made as a forging of wrought iron or steel, and the poles E' are integral with such frame, and such poles are made either with a cross-slot, as represented in Fig. 2, or with a rectangular recess or cavity, as illustrated in Fig. 3, for the reception of the neutralizing-magnets, which are formed with pole-pieces L and helices L'. In Fig. 7 the poles and core are T-shaped, and in Fig. 1 the core is represented as having a pole at each end. Either of these forms may be made use of, and it is to be understood that the poles at the ends of the cores of these neutralizing-magnets are to be in intimate contact with the surfaces of the cores or poles of the field-magnets, and the helices K of the field-magnets surround the poles E', and the helices L' of the neutralizing-magnets are within the recesses provided for them in the field-cores.

The secondary battery is represented at M, and a pole-changer is provided having helices O and O' around the pole-changing bars X and X', which are pivoted at 9 upon the keeper or cross-bar, to which is connected the magnet P, having a cross-pole the ends of which are adjacent to the pole-changing bars X and X', and upon these pole-changing bars X and X' are the contact-plates 18 19 20 21, which are insulated from each other and from the bars and come into contact or break contact with the plates or contacts 10 11 12 13 14 15 16 17, as hereinafter described, and I also provide a circuit-breaker Q in the form of a lever, pivoted at 6 and adjacent to an electromagnet R, and this breaker Q closes circuit between the contacts 25 and 26 or breaks the same when drawn back by the spring 5.

At T, I have represented incandescent lamps in multiple arc to the secondary battery M, and at W is an electromagnet the helix of which is in a shunt between the main circuit-wires, and this magnet W acts upon the rheostat-levers U and V, respectively, to throw into the circuits more or less resistance, as hereinafter described, and at Y is a circuit-changing lever acted upon by an electromagnet Y', the helix of which is in the main-line circuit passing through the lever Y and insulated contact 27, and when the magnet Y' is sufficiently energized it moves the circuit-changer Y from the contact 27 to the contact 28.

Referring now to Fig. 7, it will be observed that the circuit from the commutator-brushes 7 and 8 passes by the wires c d to the helix of the magnet P and to the point 22, where the wire d is connected to the wire e, and thence through the larger helix of the magnet P back to the brush 8. Hence this circuit remains closed at all times. There is also another circuit passing from the secondary battery M by the wire f to 25 and 26, and by g to the helices K of the field-magnets, and by the wire H to the main circuit-wire i, and thence through the helices L' of the neutralizing-magnets to the rheostat-lever U and contact 12. By following these circuit connections it will be apparent that whenever the car is in motion there will be a current circulating through the helices of the magnet P and according to the direction of rotation, so the pole of the magnet P will be magnetized either north or south, and the pole-changer X or the pole-changer X' will be attracted and the other one will be repelled and the magnet R will be energized, because the current passing from 8 by e passes through the helix of the magnet R and by d and c to the brush 7, and the circuit between 25 and 26 will be closed; but if the car is standing still the magnet R will not be energized and the circuit from the secondary battery will be broken between 25 and 26. The polarity of the bars X and X' will remain constant whenever the circuit is closed between 25 and 26, the circuit passing from the secondary battery by f 25 Q 26 g, and through the helices of the magnets O and O' and by k to 15, 12, l, U, n, 27, Y, Y', and i to the secondary battery M. Hence according to the polarity of the magnet P, resulting from the direction of rotation of the armature, so the pole-changer X will be brought into contact with 10 12 14 16 or repelled therefrom and the pole-changer X' be brought into contact with 11 13 15 17 or repelled therefrom.

If the direction of rotation is such that the pole-changer X is in the position shown in Fig. 7, a current will be passing through O and O' when the car is in motion, so as to hold the pole-changer X in position; but there will be no current passing through the helices L' until the current set up from 7 by c, 10, 18, 12, l, U, n, 27, Y, Y', M, o, 14, 20, 16, 22, e, P, and e back to 8 is sufficient to energize the magnet Y' and move the lever Y so as to rest upon both 27 and 28, when a portion of the current will be diverted and pass through the helices L', and when the lever Y is moved, so as to separate from 27, the current will pass from U entirely through the helices L' and by 28 Y Y' to the secondary battery, and this operation will only take place when the speed of the car is sufficient to develop the required electromotive force and full current for charging the battery at the average speed of movement of the car, and it will be now apparent that as the electromagnets L become energized and set up a reverse polarity to each of the field-cores these neutralizing-magnets L will increase in their neutralizing action in proportion to the speed of the armature and the current flowing in the circuit, the helices K of the field-magnets being in the circuit of the secondary battery M, while the helices of the neutralizing-magnets L' are in the circuits of the brushes, as before pointed out, which circuit also passes through the secondary battery M. Thereby the current set up by the armature will be maintained as nearly uniform as possible by the neutralizing-magnets acting in opposition to the field-magnets in proportion to the speed of the armature.

When the direction of rotation is such that the pole-changer X is thrown out of contact with its plates and the pole-changer X' is brought into position, the circuit connections, as before mentioned, are maintained, except that the current flowing in the opposite direction will pass from 8 through e P 22 17 21 15 12 l U L' i 28 Y Y' M o 14 13 19 11 c to 7, and the change of polarity in the magnet P will cause the pole-changer X' to remain in contact with its plates and the pole-changer X to be repelled.

The helix of the magnet W is in a shunt r between the brushes 7 and 8, and hence the rheostat-levers U and V will be acted upon in proportion to the current passing through the brushes, and this shunt r must have in it sufficient resistance to cause only a portion of the current to pass through such shunt, and as the armature-current may increase in electromotive force in consequence of the speed of rotation the rheostat-levers U and V will both be acted upon and will throw into the secondary-battery circuit g an increased resistance, cutting down the electric energy in the field-helices K, and at the same time the rheostat-lever U will throw into the circuit l, containing the neutralizing-helices L', an additional resistance, thus regulating the development of magnetism in the field-cores E' and the neutralizing-cores L and cutting down the lines of magnetism intersected by the revolving armature to render the output of current from such armature as nearly uniform as possible.

In Fig. 8 the same devices are illustrated as in Fig. 7, with the exception that the helix of the magnet P is shown as in a shunt r' of the main circuit between the brushes. The helices of the neutralizing-magnets L are also shown in a shunt l² of the main circuit between the brushes, and the helices of the field-magnets K are also shown in another shunt k' of the main circuit between the brushes. This figure is introduced to illustrate that the neutralizing-magnets may receive their energizing force in a shunt of the main circuit, instead of being placed in series with the secondary battery, and also to show that the helices of the field-magnets may be similarly placed, instead of being in series with the secondary battery. In this view, Fig. 8, the connections from the pole-changers X X' are not represented. They are, however, to be similar to those shown in Fig. 7.

It will be apparent that in consequence of the two helices of the electromagnet P being connected in the circuit of the commutator-brushes the polarity of the circuit-changer will depend upon the direction of rotation of the armature, and hence that the pole-changers X X' will be moved either in one direction or the other to close the circuits between the respective plates; but the circuit through the secondary battery will not be closed until the electromagnet R is sufficiently energized by the current passing through its helix as a shunt from the brushes to overcome the spring 5 and closes the circuit between 25 and 26, and when the current from the commutator is less than that from the secondary battery the circuit is broken between 25 and 26, so that the secondary battery cannot discharge through either the field-helices or the brushes and the circuit-changer Y breaks the circuit from M through Y, 28, i, L', U, l, 12, 18, 10, and c to the brushes whenever the electromotive force of the armature becomes less than that of the secondary battery, there being a spring to draw back the circuit-changer Y' to the contact 27, and the current from the secondary battery acting in the opposite direction in the helices of P to the current from the brushes will demagnetize the poles and the static action or kickback will cause both pole-changers X X' to remain out of action and their circuits to be broken until the electromotive force of the armature exceeds that of the secondary battery.

In Fig. 8 the circuit-changer Y is shown in the shunt of the neutralizing-helices L', and this can be moved by hand or by the electromagnets Y' in the main circuit.

In consequence of the circuit-changer Y being in the branch or shunt circuit of the neutralizing-helices L' the action of the neutralizing-magnet can be controlled as desired—that is to say, if the changer Y is moved by hand and remains on the plate 27 there will be current through the helices L' and the dynamo will operate the same as though there were no neutralizing-magnets, and when the changer is automatic it can be made to cut in the neutralizing-helices when the electromotive force reaches any desired point.

I claim as my invention—

1. The combination in an apparatus for electric car lighting, of a dynamo having field helices and their cores, and neutralizing electro-magnets within the cores of the field magnets, and circuit connections by which the neutralizing magnets are energized for rendering the output of the current from the armature approximately equal regardless of the speed of rotation, substantially as set forth.

2. The combination with the truck, axle and dynamo and the means for connecting the dynamo to the axle and for driving the armature, of the lower bar J and connections at its ends to the safety beam of the truck so that the dynamo frame rests and slides upon such bar J, and the emergency top bar I bolted firmly to the dynamo frame and having ends that extend across and above the safety beam, substantially as and for the purposes set forth.

3. The combination in an apparatus for electric car lighting, of a dynamo having field helices and cores, and neutralizing helices, and their pole pieces within the cores of the field helices, a secondary battery, an electro-magnetic pole changer, and circuit connections substantially as specified for directing the current according to the direction of rotation of the armature and for energizing the neutralizing magnets in proportion to the speed, substantially as set forth.

4. The combination in an apparatus for electric car lighting, of a dynamo having field helices and cores, and neutralizing helices, and their pole pieces within the cores of the field helices, a secondary battery, an electro-magnetic pole changer, and circuit connections substantially as specified for directing the current according to the direction of rotation of the armature and for energizing the neutralizing magnets in proportion to the speed, a circuit changer and its contacts, and an electro-magnet for actuating the same the helix of which magnet is in the main circuit for directing more or less current through the neutralizing helices, substantially as set forth.

5. The combination in an electric car lighting apparatus, of the dynamo having field helices, and cores, and neutralizing helices, and pole pieces, a secondary battery, an electro-magnetic pole changer, circuit connections substantially as specified, an electro-magnet and its helix in a shunt between the brushes, a rheostat and its lever in the circuit of the neutralizing helices, substantially as set forth.

6. The combination in an electric car lighting apparatus, of the dynamo having field helices, and cores, and neutralizing helices, and pole pieces, a secondary battery, an electro-magnetic pole changer, circuit connections substantially as specified, an electro-magnet and its helix in a shunt between the brushes, a rheostat and its lever controlled by said magnet in the circuit of the neutralizing helices of the field helices, substantially as specified.

7. The combination in an electric car lighting apparatus, of a dynamo having field helices and cores and neutralizing helices and pole pieces, a secondary battery, an electro-magnetic pole changer, circuit connections substantially as specified, a rheostat and its lever in the circuit of the neutralizing helices, and a rheostat and its lever in the circuit of the field helices, and an electro-magnet and its helix in the shunt between the brushes for controlling both said rheostats, substantially as specified.

8. The combination in an electric car lighting apparatus, of a dynamo having an armature revolving at a speed proportioned to the speed of the car, field helices and their pole pieces, neutralizing helices and their pole pieces, an electro-magnetic pole changer having two helices that are in a constantly closed circuit to the commutator brushes, and branch circuit connections from the same through the circuit closing plates of the pole changer and the secondary battery, connections substantially as specified for directing the armature current through such secondary battery, substantially as set forth.

9. The combination in an electric car lighting apparatus, of a dynamo having an armature revolving at a speed proportioned to the speed of the car, field helices and their pole pieces, neutralizing helices and their pole pieces, an electro-magnetic pole changer having two helices that are in a constantly closed circuit to the commutator brushes, and branch circuit connections from the same through the circuit closing plates of the pole changer and the secondary battery, connections substantially as specified for directing the armature current through such secondary battery, a circuit breaker and an electro-magnet for operating the same, the helix of which is in a shunt from the commutator brushes, such circuit breaker acting to break the circuit to the secondary battery when the electromotive force of the dynamo becomes less than that of the secondary battery, substantially as set set forth.

10. The combination with the armature and field magnets in a dynamo, of a neutralizing electro magnet and circuit connections, and an armature lever and circuit preserving contacts, and an electro-magnet with its helix in the main line passing through the armature lever for bringing the neutralizing helices into or out of the main circuit, substantially as set forth.

Signed by me this 5th day of January, 1895.

WILLIAM BIDDLE.

Witnesses:
 GEO. T. PINCKNEY,
 S. T. HAVILAND.